US009351169B2

(12) United States Patent
Bakker et al.

(10) Patent No.: US 9,351,169 B2
(45) Date of Patent: May 24, 2016

(54) COMPUTING CLOUD IN A WIRELESS TELECOMMUNICATION SYSTEM (75) Inventors: Hajo Bakker, Eberdingen (DE); Hans-Peter Mayer, Ditzingen (DE); Uwe Doetsch, Freudental (DE)

(73) Assignee: Alcatel Lucent, Boulogne-Billancourt (FR)

( * ) Notice: Subject to any disclaimer, the term of this patent is extended or adjusted under 35 U.S.C. 154(b) by 264 days.

(21) Appl. No.: 14/004,353

(22) PCT Filed: Feb. 23, 2012

(86) PCT No.: PCT/EP2012/053072
§ 371 (c)(1),
(2), (4) Date: Sep. 10, 2013

(87) PCT Pub. No.: WO2012/123228
PCT Pub. Date: Sep. 20, 2012

(65) Prior Publication Data
US 2013/0343281 A1 Dec. 26, 2013

(30) Foreign Application Priority Data
Mar. 11, 2011 (EP) .................................... 11290123

(51) Int. Cl.
*H04L 1/00* (2006.01)
*H04W 16/02* (2009.01)
(Continued)

(52) U.S. Cl.
CPC ............ *H04W 16/02* (2013.01); *G06F 9/5072* (2013.01); *H04L 67/10* (2013.01); *H04W 36/023* (2013.01); *H04W 72/0406* (2013.01); *G06F 2209/509* (2013.01); *H04W 28/08* (2013.01)

(58) Field of Classification Search
CPC ............................................... H04W 72/0406
USPC ....................................................... 370/252
See application file for complete search history.

(56) References Cited

U.S. PATENT DOCUMENTS

2010/0214923 A1* 8/2010 Vivanco et al. ............... 370/235
2011/0014918 A1* 1/2011 Padfield et al. ............... 455/442
(Continued)

FOREIGN PATENT DOCUMENTS

CN 101945370 1/2011
CN 101977242 2/2011
(Continued)

OTHER PUBLICATIONS

Mell et al., The NIST Definition of Cloud Computing, Sep. 2011, National Institute of Standards and Technology (NIST) Special Publication 800-145, p. 2.*
(Continued)

*Primary Examiner* — Mark Rinehart
*Assistant Examiner* — Matthew Hopkins
(74) *Attorney, Agent, or Firm* — Fay Sharpe LLP (57) ABSTRACT The invention relates to a method for communication in a wireless telecommunication system, wherein the wireless telecommunication system comprises a plurality of base stations (102) and at least one computing cloud (100), wherein the plurality of base stations are each connected to the at least one computing cloud, wherein the computing cloud comprises a plurality of computing devices, wherein the computing cloud is operatively coupled to the plurality of base stations, and wherein the method comprises the following steps: performing (S1) time-critical operations by the plurality of base stations; performing (S2) non-time-critical operations by the at least one computing cloud for the plurality of base stations; and exchanging (S3) control data between the plurality of base stations and the at least one computing cloud; wherein the non-time-critical operations comprise at least one of the following operations: handover procedures, call admissions, load balancing, gathering statistical data of cells of the wireless telecommunication system, configuration management for the cells of the wireless telecommunication system, and operations for self organizing functions of the wireless telecommunication system, and wherein the control data is used by the computing cloud for performing the non-time-critical operations.

10 Claims, 3 Drawing Sheets (51) Int. Cl.
  *H04W 72/04* (2009.01)
  *G06F 9/50* (2006.01)
  *H04W 36/02* (2009.01)
  *H04L 29/08* (2006.01)
  *H04W 28/08* (2009.01)

(56) References Cited

U.S. PATENT DOCUMENTS

2011/0228685 A1* 9/2011 Higashi et al. ............... 370/252
2014/0098768 A1  4/2014 Zhang et al.

FOREIGN PATENT DOCUMENTS

| JP | 2007-013463 | 1/2007 |
| JP | 2007-502559 | 2/2007 |
| JP | 2007-511136 | 4/2007 |
| WO | WO 2005/018256 | 2/2005 |

OTHER PUBLICATIONS

"LTE: Evolved Universal Terrestrial Radio Access Network (E-UTRAN); Self-configuring and self-optimizing network (SON) use cases and solutions (3GPP TR 36.902 version 9.3.0 Release 9)," ETSI TR 136 902 V9.3.0, XP014061819, pp. 1-22, Jan. 2011.
International Search Report for PCT/EP2012/053072 dated Jun. 14, 2012.
Japanese Office Action dated Aug. 19, 2014.

* cited by examiner

COMPUTING CLOUD IN A WIRELESS TELECOMMUNICATION SYSTEM

FIELD OF THE INVENTION

The invention relates to the filed of mobile telecommunication, in particular to a wireless telecommunication system comprising a computing cloud.

BACKGROUND AND RELATED ART

The majority of operations performed by a wireless telecommunication system is performed by the base stations of the wireless telecommunication system. For example handovers are initiated and performed by the base stations, call admissions are performed by the base stations, load balancing is performed by the base stations, statistical data is gathered by the base stations and the cells of the wireless telecommunication system are configured by the base stations.

US 2011/0014918 A1 describes a cellular communication system supported by first physical layer processes, second layer user plane control processes and third layer control plane control processes. The first layer process is executed in a base station. A distribution controller allocates the layer processes such that the second layer process is executed in a different network element than the third layer process. The second and/or third layer process may furthermore be allocated to a different network element than the base station executing the first layer process. The second and/or third layer process may be allocated to base stations. This allows improved load balancing and/or may reduce RNC relocations in a system having base station RNC functionality.

SUMMARY

It is an object of the present invention to provide an improved method for communication in a wireless telecommunication system, an improved wireless telecommunication system, and an improved computing cloud for such a wireless telecommunication system.

The object of the invention is achieved by the subject matter of the independent claims. Embodiments of the invention are given in the dependent claims.

The invention relates to a method for communication in a wireless telecommunication system. The wireless telecommunication system comprises a plurality of base stations and at least one computing cloud. The plurality of base stations are each connected to the at least one computing cloud. Optionally the base stations are connected to each other in addition.

The computing cloud comprises a plurality of computing devices such as computers or servers. The computing cloud is operatively coupled to the plurality of base stations. In other words, signals may be exchanged between the computing cloud and the plurality of base stations.

The computing cloud may for example be a plurality of servers being located centrally in the wireless telecommunication system. The servers are coupled to each other. The connections between the servers may for example be connections according to the X2 interface which is defined by the Third Generation Partnership Program (3GPP) for the Long Term Evolution (LTE) standard. Additionally or alternatively other connections can be used that are not adapted for real-time communication because the computing cloud only performs non-time-critical operations. For example, a wireless telecommunication system comprises four computing clouds. The computing clouds are used for performing non-time critical operations for the plurality of base stations. In other words, non-time critical operations, which are performed by base stations in common wireless telecommunication systems, are performed by the computing cloud. This allows minimizing the processing capacity of the base stations. The more non-time critical operations are outsourced to the computing cloud the less processing capacity is required in the base stations. Therefore the size of the base station and the production costs of the base stations can be reduced.

The computing cloud only performs non-time critical operations. Time critical operations are performed by the plurality of base stations. It is advantageous to perform time critical operations in the base stations because transmitting data to the computing cloud and receiving data from the computing cloud induces a time delay into the signal processing step. This time delay could be too high for time critical operations.

Time critical operations are for example coding and decoding of data and giving feedback to data received from a mobile device. A mobile device may for example be a mobile telephone, a PDA, a mobile computer, or a smartphone.

Time-critical operations could also be described as real-time operations. Real-time operations are understood herein in particular as operations having a requirement of maximum allowed timing delays. These maximum allowed timing delays can for example be defined in standards such as the standards of the Third Generation Partnership Program (3GPP).

In general, time critical operations are operations where an induced additional delay because of signal transmission from the base stations to the computing cloud and vice versa corresponds to a high risk of radio failures and unwanted disconnections of mobile devices. For example an HARQ process has strong timing requirements with respect to round trip delay. Hence, the HARQ process is performed by the plurality of base stations because of the timing requirements.

As mentioned above, non-time critical operations are performed by the at least one computing cloud for the plurality of base stations. In other words, the computing cloud performs operations that could also be performed by the plurality of base stations. It is advantageous to perform the non-time critical operations by the computing cloud because processing capacities of the base stations can be reduced. It is especially advantageous to use the computing cloud for non-time critical operations because the computing cloud performs the operations for a plurality of base stations. Hence, the processing capacities of the computing cloud have to be adjusted to the maximum required processing capacity for the plurality of base stations. Thus it is not important if a first base station of the plurality of base stations has a high processing load and a second base station has a low processing load or if the first base station and the second base station both have medium processing loads. In other words peaks of the processing capacities required for one base station are balanced by load processing capacities required for other base stations of the plurality of base stations.

It is not anymore necessary to provide enough processing capacity for each base station for the maximum required peak processing capacity. Instead the computing cloud comprises enough processing capacities for the overall processing capacity required for the plurality of base stations. This means that the total processing capacity is reduced because not all of the plurality of base stations has their peak requirements for processing capacities at the same time.

Non-time critical operations that may be performed by the computing cloud comprise at least one of the following operations: handover procedures, call admissions, load balancing, gathering statistical data of cells of the wireless telecommunication system, configuration management for the cells of the wireless telecommunication system, and operations for self-organizing functions of the wireless telecommunication system. Control data is exchanged between the plurality of base stations and the at least one computing cloud for performing these non-time critical operations.

Handover procedures may for example be initiated and performed by the computing cloud. Signal powers and/or signal strengths measured by mobile devices and transmitted to the base station to which the mobile device is connected are forwarded by the respective base station to the computing cloud. The computing cloud can decide to initiate and perform a handover of the mobile device to another cell. Alternatively the mobile device triggers the handover procedure by transmitting a handover trigger signal to the base station. The base station then forwards the trigger signal to the computing cloud and the computing cloud performs the handover of the mobile device from a source cell to a target cell.

It is especially advantageous to perform load balancing of the cells of the wireless telecommunication network in the computing cloud. Load balancing operations balance the data load of the cells such that the data load distribution among the cells is optimized. Load balancing can comprise operations such as adjustment of signal strengths, adjustment of frequency re-uses, adjustment of handover parameters, and/or adjustment of cell sizes and any other procedure known from the prior art for load balancing among cells in a cellular wireless telecommunication network. Performing load balancing in the computing cloud is especially advantageous when the computing cloud also gathers statistical data of the cells of the wireless telecommunication network. In this case the computing cloud can decide to perform load balancing based on the gathered statistical data without transmitting or receiving additional signals from the plurality of base stations. All data being required for load balancing is already present in the computing cloud.

Operations for self-organizing networks may also be performed by the computing cloud. This is also especially advantageous when statistical data is gathered by the computing cloud. In this case the computing cloud can perform operations for the self-organizing network without signal exchanges between the base stations or other network entities and the computing cloud. The data being relevant for self-organizing network operations is already present in the computing cloud.

The computing cloud can also perform configuration management. In other words the computing cloud adjusts or sets the parameters for cells of the wireless telecommunication system, especially for cells being established in the wireless cornmunication system.

According to embodiments of the invention the computing cloud comprises at least one first buffer. Each base station of the plurality of base stations comprises at least one second buffer. Payload data to be sent to a mobile device connected with the respective base station is buffered in the first buffer, transmitted from the computing cloud to the respective base station, buffered in the second buffer and sent to the mobile device. As two buffers are used for the payload data the size of the buffer in the base station can be reduced because the data is additionally buffered in the computing cloud. Payload data may for example be voice data, video data, internet data or any other data being requested by the mobile device. This is especially advantageous when handover procedures are performed by the computing cloud. When the handover procedure is initiated the computing cloud transmits the data being located in the second buffer to the target base station of the handover procedure. Hence, the data being required by the mobile device is already present in the buffer of the target base station before the mobile device is handed over to the target base station without that data needs to be exchanged between the source base station and the target base station.

According to embodiments of the invention the plurality of base stations are connected to each other for data forwarding from a first base station of the plurality to a second base station of the plurality. In this case data may be exchanged between the plurality of base stations without involving the computing cloud.

According to embodiments of the invention a handover of a mobile device from a source base station of the plurality of base stations to a target base station of the plurality of base stations is initiated by the computing cloud. After initiating the handover procedure at least a portion of the payload data is transmitted from the computing cloud to the target base station before the mobile device is handed over to the target base station. It is to be noted that only a portion of the payload data being stored in the first buffer of the computing cloud can be transmitted to the target base station or all data being stored in the buffer of the computing cloud can be transmitted to the target base station before the mobile device is handed over to the target base station. If only a portion of the payload data is transmitted to the target base station before the mobile device is handed over the rest of the payload data being stored in the first buffer of the computing cloud is transmitted to the target base station after the handover procedure.

According to embodiments of the invention the time critical operations are coding of signals to be transmitted to a mobile device, decoding of signals received from the mobile device, and transmitting feedback to signals received from the mobile device. According to embodiments of the invention the wireless telecommunication system is a system operating according to LTE, GSM, or UMTS standards. All these standards have been developed by the Third Generation Partnership Program (3GPP).

According to embodiments of the invention load balancing is performed according to LTE standards. For load balancing LTE standards see 3GPP: TR 36.902 V9.3.0 (2010-12) Chapter 4.6.

According to embodiments of the invention the operations for the self-organizing functions of the wireless telecommunication system are performed by the computing cloud. The statistical data of the cells are gathered by the computing cloud and stored in the computing cloud. The statistical data is used by the computing cloud for performing the operations for the self-organizing functions. The self-organizing functions comprise at least one of the following operations: changing a transmission power of at least one base station of the plurality of base stations, changing a cell size of at least one cell of the wireless telecommunication system, changing handover parameters for performing handovers from a source cell to a target cell.

According to embodiments of the invention the plurality of base stations are cornprised by a further computing cloud. The computational operations of a first base station of the further computing cloud can be performed by a second base station of the further computing cloud. In other words, the plurality of base stations is operated as a further computing cloud. This allows distributing the computational effort required by the base stations over the plurality of base stations such that the required processing capacity of each base station can be further reduced.

According to embodiments of the invention the plurality of base stations comprises subgroups of base stations. Each subgroup comprises a plurality of antennas and one computing unit. Signals are received from mobile devices over the antennas. These signals are then processed by the computing unit. The computing unit performs time-critical operations that are explained in more detail above. In other words, a subgroup of base stations comprises a plurality of antennas, wherein each antenna serves at least onecell of the wireless telecommunication system. The antennas are used for communication with mobile devices being located in the cells. Each antenna may for example serve exact one cell. Alternatively one cell can be served by more than one antenna.

The signals received via the antennas are forwarded to the computing unit of the subgroup. Time-critical operations are performed by the computing unit and the signals are forwarded to the computing cloud for non-time-critical operations as explained above.

Embodiments of the invention are advantageous because a plurality of cells, which is served by the subgroup of base stations, requires only one computing unit. Hence, the processing capacities can be further reduced. The computing unit has enough processing capacities for processing the overall traffic load of the plurality of cells. However, less processing capacities are required, because peak loads in one cell are balanced because the other cells will most likely not have a peak load at the same time. Hence, production costs and base station sizes can be reduced. Each cell can for example be allocated to one antenna and one computing unit. The computing unit serves more than one cell. Alternatively, a cell can be allocated to more than one antenna.

In another aspect the invention relates to a wireless telecommunication system comprising a plurality of base stations and at least one computing cloud. The plurality of base stations and the at least one computing cloud are adapted to perform a method according to embodiments of the invention.

The computing cloud comprises means for performing non-time critical operations for the plurality of base stations, means for transmitting control data to the plurality of base stations, and means for receiving control data from the plurality of base stations. The control data is used for enabling the computing cloud to perform the non-time critical operations.

Each of the plurality of base stations comprises means for performing time critical operations, means for transmitting control data to the computing cloud, and means for receiving control data from the computing cloud. The non-time critical operations and the time critical operations are explained above with respect to the explained method.

In yet another aspect the invention relates to a computing cloud for a wireless telecommunication system. The computing cloud comprises means for performing non-time critical operations for the plurality of base stations. This means that the computing cloud is adapted to perfomi operations being performed by the plurality of base stations in state of the art wireless telecommunication systems. In other words the non-time critical operations could also be performed by each base station of the plurality of base stations. The choice to perform the non-time critical operations in the computing cloud allows to reduce the processing capacities of the base stations of the plurality of base stations. Further, the computing cloud comprises means for transmitting control data to the plurality of base stations and means for receiving control data from the plurality of base stations. The control data may be used by the means for performing non-time critical operations of the computing cloud for performing the non-time critical operations. The time critical and non-time critical operations are explained above with respect to embodiments of the invention.

BRIEF DESCRIPTION OF THE DRAWINGS

In the following embodiments of the invention are explained in greater detail, by way of example only, making reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
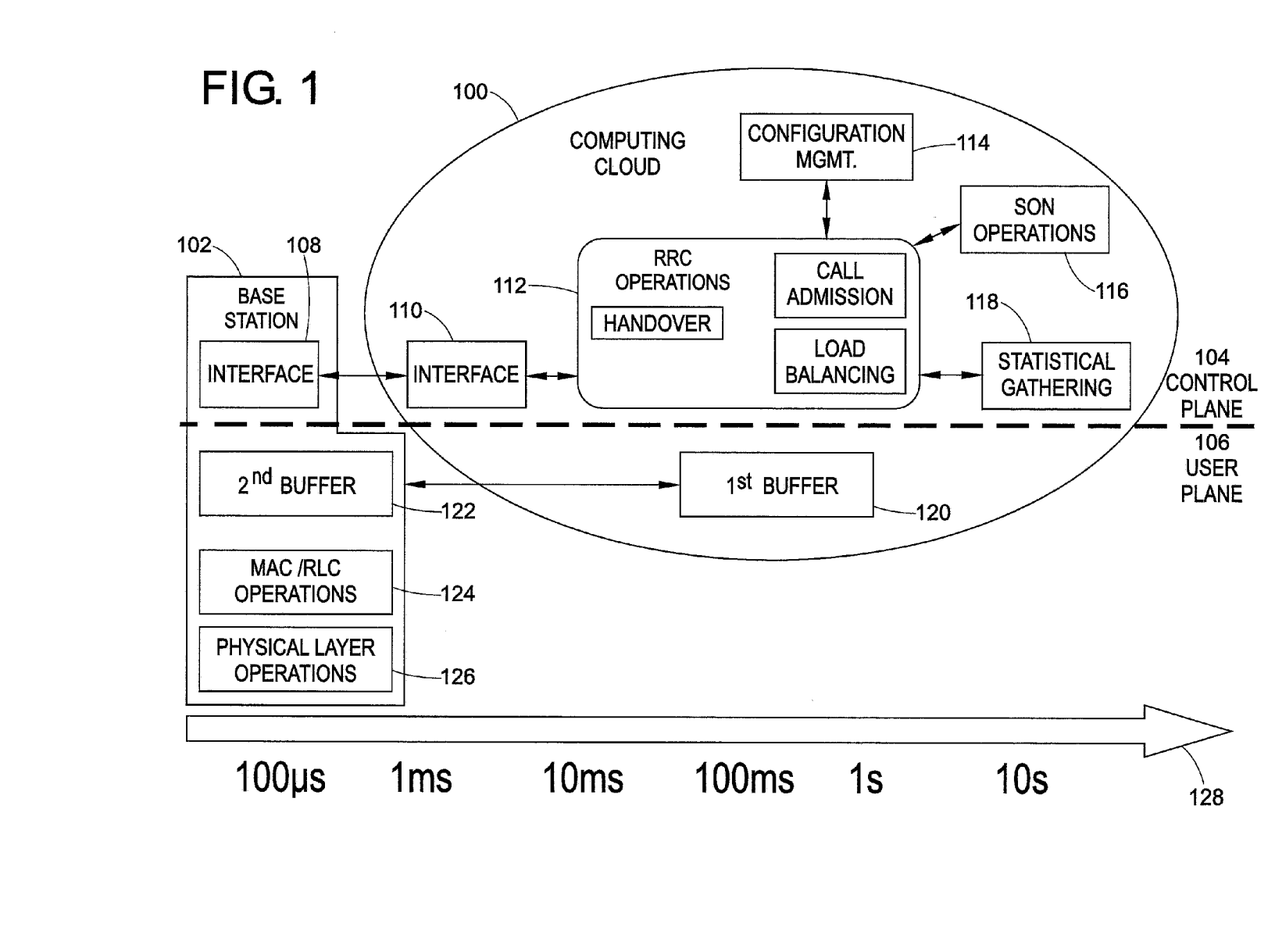
FIG. 1 is a schematic view of a base station and a computing cloud.

FIG. 1 is a schematic view of a computing cloud 100 and a base station 102. The computing cloud 100 comprises several computing units such as servers or computers. The base station 102 is located outside the computing cloud 100. FIG. 1 is separated into a control plane 104 and a user plane 106. The computing cloud 100 and the base station 102 both have means being located in the control plane 104 and means being located in user plane 106.

The base station 102 is connected to the computing cloud 100 via interfaces 108 and 110. Interface 108 is located in base station 102 and interface 110 is located in computing cloud 100. Both interfaces 108 and 110 are located in the control plane 104.

The computing cloud 100 comprises several means for performing computational operations. The computing cloud 100 comprises means for performing radio resource control (RRC) operations 112. The means for performing RRC operations 112 are adapted to perform and initiate handover procedures for mobile devices being connected to base station 102, call admissions for such mobile devices, and load balancing for cells being served by base station 102. Load balancing may for example be performed according to LTE standards. It is to be noted that the computing cloud 100 is preferably connected to a plurality of base stations 102. For clarity reasons only one base station 102 is depicted. The means 112 for performing RRC operations are adapted to perform and initiate handover procedures, call admissions and load balancing for each base station of the plurality of base stations being connected to the computing cloud 100.

The computing cloud 100 further comprises means 114 for configuration management of cells of the wireless telecommunication network. The means 114 can adjust and/or set parameters for newly established cells in the wireless telecommunication network. Such parameters are for example signal transmission strength or power, cell size and/or handover parameters.

The computing cloud 100 further comprises means 116 for performing operations of a self-organizing network (SON). The SON operations can for example be adjusting of parameters such as handover parameters, signal strength and/or signal power, and/or cell sizes.

Further, the computing cloud 100 comprises statistic means 118 for gathering statistical data of cells of the wireless telecommunication network. The statistical data may for example be used for load balancing by means 112. The statistical data comprises statistics about traffic loads in the cells of the wireless telecommunication network for different day times, days, and/or months. Based on this data load balancing can be performed. It is advantageous to have the statistical data in the computing cloud 100 because load balancing, handovers, configuration management and SON operations can be performed without exchanging signals with external components. Hence the signaling effort is reduced by gathering statistical data in the computing cloud and performing load balancing, SON operations, configuration management and handovers in the computing cloud 100.

All above mentioned means 112-118 of the computing cloud 100 are located in the control plane. Further, the computing cloud 100 comprises a first buffer 120 in the user plane. The first buffer 120 is adapted to exchange data with the second buffer 122. The second buffer 122 is located in the user plane 106 of the base station 102. A flow control protocol is used for exchanging data between the first buffer 120 and the second buffer 122. The second buffer 122 is adapted to request data from the first buffer 120 and the first buffer 120 is adapted to send data to the second buffer 122. The data being transmitted from the first buffer 120 to the second buffer 122 is preferably payload data that shall be sent to a mobile device being connected to the base station 102. Payload data may for example be voice data, internet data or any other data requested by the mobile device. By using a first buffer 120 in the computing cloud 100 the second buffer 122 of the base station 102 can be of reduced size in comparison to buffers known from the prior art.

In case of a handover of a mobile device from the base station 102 to a further base station being also connected to the computing cloud 100 the payload data being stored in the first buffer 120 can be transmitted to a third buffer in the further base station to which the handover shall be performed. Hence no data exchange between the base station 102 and the further base station is necessary in case of a handover procedure. A further advantage is that the handover procedure is initiated and performed by the means 112 for RRC operation of the computing cloud 100. Hence, the computing cloud 100 performs the handover and also transmits the payload data to the target base station. A synchronization of these procedures inside the computing cloud 100 is very simple and easy to implement.

The base station 102 further comprises means for performing medium access control (MAC) and radio link control (RLC) operations 124. Further, the base station 102 comprises means 126 for performing physical layer operations. The means 124 and 106 are located in the user plane 106 of the base station 102.

The means for MAC/RLC operations 124 and the means for physical layer operations 126 are located in the base station 102 because these operations are time critical and a delay induced by signal transmission to the computing cloud 100 would cause critical errors such as radio link failures and disconnections of mobile devices. Such time critical operations are for example coding and decoding of signals being received and transmitted to mobile devices being connected to base station 102 and giving feedback to received signals from mobile devices. This is especially advantageous for hybrid automatic repeat request procedures (HARQ) according to the LTE, HSUPA and HSDPA standard of the Third Generation Partnership Project (3GPP).

FIG. 1 further shows an arrow 128 indicating the time delay added to the signals being processed by the different means 112-126 in the computing cloud 100 and the base station 102. The delay corresponds to the arrangement of the means 112-126. For example the means 108, 122, 124 and 126 are located at the beginning of the arrow 128, which means that the delay caused by these means lies in between 100 µs and 1 ms. The delay caused by means 112 lies in between 10 ms and 1 second. The delay caused by means 114 lasts between 100 ms and 1 second, the delay caused by means 116 lies between 1 second and 10 seconds and the delay caused by means 118 lies in the range of 8-12 seconds. All above mentioned delay values are the values added to the signal for one-way transmission of the signal. Hence, a signal being transmitted from the base station 102 to means 112 experiences an additional delay of 10 ms and a signal back from means 112 to the base station 102 is subject to another delay of 10 ms such that the total delay is 20 ms. This is why time critical functions are executed inside base station 102 by means 122-126.

Figure 2:
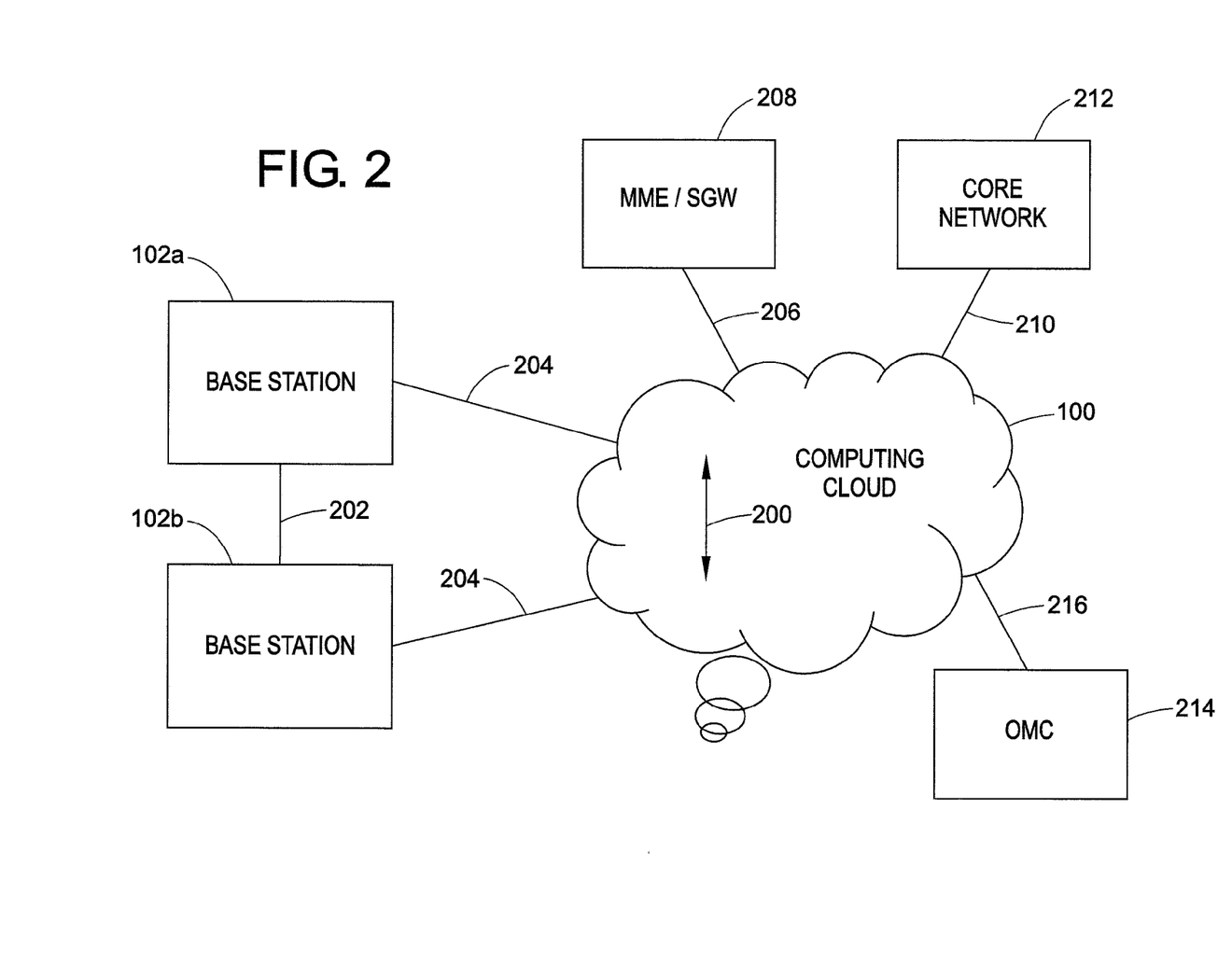
FIG. 2 is a schematic view of a wireless telecommunication system comprising a computing cloud and a plurality of base stations.

FIG. 2 is a block diagram of a wireless telecommunication system comprising a computing cloud 100 and two base stations 102a and 102b. It is to be noted that only two base stations 102a and 102b are depicted in FIG. 2 for clarity reasons although much more than two base stations may be connected to the computing cloud 100. The base stations 102a and 102b are designed similarly to base station 102 depicted in FIG. 1.

The base stations 102a and 102b are connected via connections 202 to each other. This connection 202 is optional and not mandatory for base stations according to embodiments of the invention. The connection 202 is used for data forwarding between the base stations 102a and 102b for example in case of a handover. Data may be transferred from a source base station 102a to a target base station 102b for providing a mobile device being handed over from source base station 102a to target base station 102b with data. The base stations 102a and 102b are connected to the computing cloud 100 via connections 204. Control data and payload data is exchanged between the computing cloud 100 and the base stations 102a and 102b via connections 204. Payload data may for example be voice data, internet data, or any other data being requested by a user of the mobile telecommunication network. Control data may for example be any data being exchanged in the control plane 106 depicted in FIG. 1. Control data may for example be data being necessary for handover reasons, self-organizing network functions, statistical data of cells being served by base stations 102a and/or base station 102b, and any parameters being set or adjusted by the computer cloud 100 for base stations 102a and 102b.

Communication between the different computing devices in computing cloud 100 is performed by connection 200. For clarity reasons only one connection 200 is depicted in FIG. 2. The computing devices of computing cloud 100 communicate with each other over such connections 200. Such connections may for example be established according to the X2 interface of the LTE standard.

A mobility management entity and/or a serving gateway 208 is connected via connection 206 to the computing cloud 100. The mobility management entity 208 may also be referred to as MME. The mobility management entity 208 operates according to 3GPP standards and the serving gateway 208 is operated according to 3GPP LTE standards. The connection 206 may for example be a connection according to the 3GPP S1 standard.

Via another connection 210 the core network for 2G and 3G networks 212 is connected to computing cloud 100. The core network comprises for example an operation and maintenance centre. The operation and maintenance centre serves the provider for maintaining the wireless telecommunication network and for surveillance of the wireless telecommunication network.

For wireless telecommunication systems according to the 3G standard the computing cloud 100 comprises functionalities that are comprised in state of the art 3G systems by the radio network controller (RNC). Such functionalities are for example High Speed Downlink Packet Access (HSDPA) and High Speed Uplink Packet Access (HSUPA) functionalities.

For 2G networks according to the GSM standard (Global System for Mobile Communications) the computing cloud 100 may perform operations that are performed in state of the art systems by the base station controller (BSC). Additionally, the computing cloud 100 may also perform operations that are performed in state of the art systems by the Transcoding und Rate Adaption Unit (TRAU). Such operations could for example be transcoding of voice data from a first bit rate to a second bit rate. Other data requested by a user, e.g. video data or internet data, could also be transcoded by the computing cloud 100.

An operation and maintenance center 214 is connected to the computing cloud 100 via connection 216. The operation and maintenance center 214 serves for the provider of the wireless telecommunication network as a surveillance center of the computing cloud 100.

Figure 3:
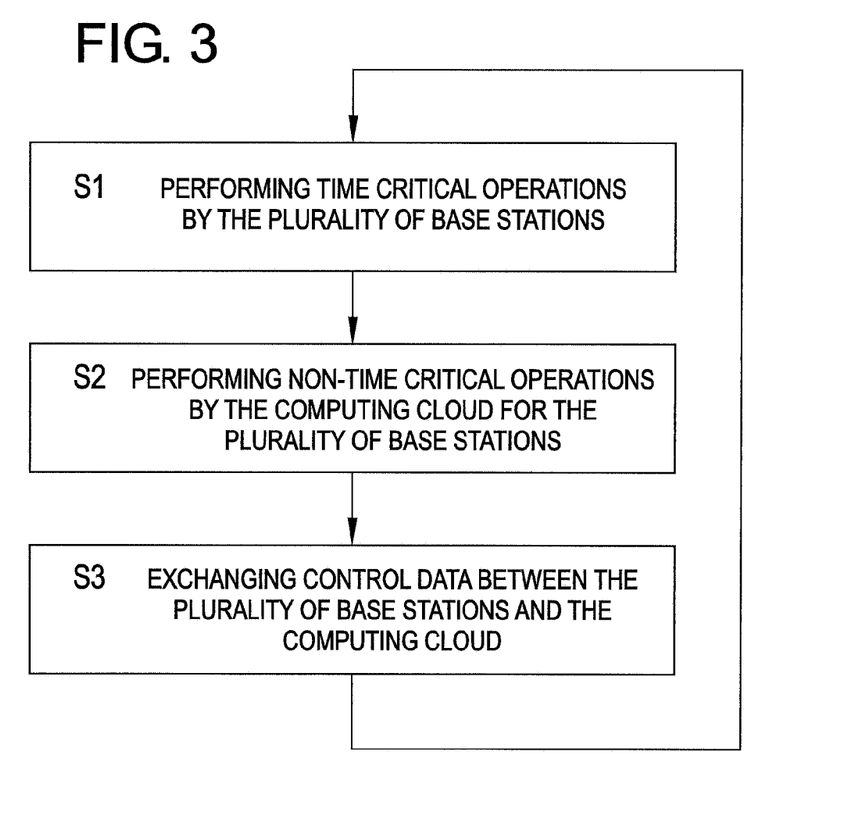
FIG. 3 is a flow diagram of a method according to embodiments of the invention.

FIG. 3 is a flow diagram of a method according to embodiments of the invention. In a first step S1 time critical operations such as coding and decoding of signals and giving feedback to signals received from a mobile device are performed by a plurality of base stations. The plurality of base stations is connected to the computing cloud as depicted in FIGS. 1 and 2. Time critical operations are performed by the plurality of base stations because outsourcing these operations into the computing cloud would cause additional time delays to the operations which may be critical and cause radio link failures and disconnections.

In step S2 non-time critical operations are performed by the computing cloud for the plurality of base stations. This means that operations where an additional delay of several hundreds of milliseconds or even seconds does not cause directly radio link failures or disconnections is outsourced into the computing cloud. These operations could also be performed by the base stations. However, it is advantageous to outsource these operations into the computing cloud for reducing processing capacities in the base stations. The computing cloud performs these operations for all the base stations of the plurality of base stations. Hence, peaks in the traffic load of certain cells of the wireless telecommunication network are balanced because other cells will not have a peak traffic load at the same time. In other words, the capacity of the computing cloud is high enough for the maximum required processing capacities but lower than the processing capacity which would be used if each cell would have the processing capacities for handling its maximum traffic load.

It is to be noted that the steps S1 and S2 can be performed at the same time or step S1 can be performed before step S2 and vice versa.

In step S3 control data is exchanged between the plurality of base stations and the at least one computing cloud. Step S3 is required for step S2 because the control data is used by the computing cloud for performing the non-time critical operations. Control data may for example be handover data, parameters of the cells of the wireless telecommunication network, and/or statistical data.

The non-time critical operations performed by the computing cloud in step S2 may for example be handover procedures, call admissions, load balancing, gathering statistical data of cells of the wireless telecommunication network, configuration management for the cells of the wireless telecommunication system, and operations for self-organizing functions of the wireless telecommunication system. Performing all these operations in the computing cloud is advantageous because the signaling effort is reduced in comparison to state of the art wireless telecommunication systems. The statistical data and operations using the statistical data are performed in the computing cloud. Hence additional signaling effort is avoided. Additionally the processing capacity of the base stations can be reduced, which reduces also the production costs and the size of the base station.

The time critical operations are performed by the base stations because performing these operations in the computing cloud would cause unnecessary radio link failures and disconnections due to added time delay. This is especially advantageous for hybrid automatic repeat request. The time critical operations are preferably coding and decoding of signals and giving feedback to signals received from mobile devices being connected to the respective base station.

| List of reference numerals | |
|---|---|
| 100 | Computing cloud |
| 102 | Base station |
| 104 | Control plane |
| 106 | User plane |
| 108 | Interface |
| 110 | Interface |
| 112 | Means for RRC operations |
| 114 | Means for configuration management |
| 116 | Means for SON operations |
| 118 | Statistic means |
| 120 | First buffer |
| 122 | Second buffer |
| 124 | Means for MAC/RLC operations |
| 126 | Means for physical layer operations |
| 128 | Arrow |
| 200 | Connection |
| 202 | Connection |
| 204 | Connection |
| 206 | Connection |
| 208 | MME, serving gateway |
| 210 | Connection |
| 212 | Core network |
| 214 | OMC |
| 216 | Connection |

The invention claimed is:

1. A method for communication in a wireless telecommunication system, wherein the wireless telecommunication system comprises a plurality of base stations and at least one computing cloud, wherein the plurality of base stations are connected to the at least one computing cloud, wherein the computing cloud comprises a plurality of computing devices, wherein the computing cloud is operatively coupled to the plurality of base stations, and wherein the method comprises:

performing time-critical operations by the plurality of base stations;

performing non-time-critical operations by the at least one computing cloud for the plurality of base stations; and exchanging control data between the plurality of base stations and the at least one computing cloud;

wherein the non-time-critical operations comprise at least one of the following operations: handover procedures, call admissions, load balancing, gathering statistical data of cells of the wireless telecommunication system, configuration management for the cells of the wireless telecommunication system, and operations for self organizing functions of the wireless telecommunication system, and wherein the control data is used by the computing cloud for performing the non-time-critical operations, wherein the computing cloud comprises at least one first buffer, wherein at least one base station of the plurality of base stations comprises at least one second buffer, wherein payload data to be sent to a mobile device connected with the respective base station is buffered in the first buffer, transmitted from the computing cloud to the respective base station, buffered in the second buffer, and sent to the mobile device, wherein a handover of a mobile device from a source base station of the plurality of base stations to a target base station of the plurality of base stations is initiated by the computing cloud, wherein after initiating the handover procedure at least a portion of the payload data is transmitted from the computing cloud to the target base station before the mobile device is handed over to the target base station.

2. The method according to claim 1, wherein the plurality of base stations are connected for data forwarding from a first base station of the plurality of base stations to a second base station of the plurality of base stations.

3. The method according to claim 1, wherein the time-critical operations are coding of signals to be transmitted to a mobile device, decoding of signals received from the mobile device, and transmitting feedback to signals received from the mobile device.

4. The method according to claim 1, wherein the wireless telecommunication system is a system operating according to LTE, GSM, or UMTS standards.

5. The method according to claim 1, wherein load balancing is performed according to LTE standards.

6. The method according to claim 1, wherein the operations for the self organizing functions of the wireless telecommunication system are performed by the computing cloud, wherein the statistical data of the cells are gathered by the computing cloud and stored in the computing cloud, wherein the statistical data is used by the computing cloud for performing the operations for the self organizing functions, wherein the self organizing functions comprise at least one of:
 changing a transmission power of at least one base station of the plurality of base stations;
 changing a cell size of at least one cell of the wireless telecommunication system;
 changing handover parameters for performing handovers from a source cell to a target cell.

7. The method according to claim 1, wherein the plurality of base stations are comprised by a further computing cloud, and wherein computational operations of a first base station of the further computing cloud can be performed by a second base station of the further computing cloud.

8. The method according to claim 1, wherein the plurality of base stations comprises subgroups of base stations, wherein at least one subgroup comprises a plurality of antennas and one computing unit, wherein the computing unit performs time-critical operations concerning signals received from the plurality of antennas.

9. A wireless telecommunication system comprising a plurality of base stations and at least one computing cloud, wherein the computing cloud comprises one or more processors configured to:
 perform non-time-critical operations for the plurality of base stations; and
 transmit control data to the plurality of base stations;
 receive control data from the plurality of base stations;
 buffer payload data to be sent to a mobile device;
 transmit the payload data to one of the plurality of base stations;
wherein the plurality of base stations comprises one or more processors configured to:
 perform time-critical operations;
 transmit control data to the computing cloud;
 receive control data from the computing cloud;
 buffer the payload data;
 send the payload data to the mobile device;
wherein the non-time-critical operations comprise at least one of the following operations: handover procedures, call admissions, load balancing, gathering statistical data of cells of the wireless telecommunication system, configuration management for the cells of the wireless telecommunication system, and operations for self organizing functions of the wireless telecommunication system, and wherein the control data is used by the computing cloud for performing the non-time-critical operations, wherein a handover of a mobile device from a source base station of the plurality of base stations to a target base station of the plurality of base stations is initiated by the computing cloud, wherein after initiating the handover procedure at least a portion of the payload data is transmitted from the computing cloud to the target base station before the mobile device is handed over to the target base station.

10. A computing cloud for a wireless telecommunication system comprising one or more processors configured to:
 perform non-time-critical operations for a plurality of base stations; and
 transmit control data to the plurality of base stations;
 receive control data from the plurality of base stations;
 buffer payload data to be sent to a mobile device;
 transmit the payload data to one of the plurality of base stations;
wherein the non-time-critical operations comprise at least one of the following operations: handover procedures, call admissions, load balancing, gathering statistical data of cells of the wireless telecommunication system, configuration management for the cells of the wireless telecommunication system, and operations for self organizing functions of the wireless telecommunication system, and wherein the means for performing the non-time-critical operations are adapted to use the control data for performing the non-time-critical operations, wherein a handover of a mobile device from a source base station of the plurality of base stations to a target base station of the plurality of base stations is initiated by the computing cloud, wherein after initiating the handover procedure at least a portion of the payload data is transmitted from the computing cloud to the target base station before the mobile device is handed over to the target base station.

* * * * *